United States Patent
D'Errico et al.

(10) Patent No.: US 10,650,138 B2
(45) Date of Patent: May 12, 2020

(54) SYSTEM CALL POLICIES FOR CONTAINERS

(71) Applicant: Hewlett Packard Enterprise Development LP, Houston, TX (US)

(72) Inventors: Michela D'Errico, Bristol (GB); Leon Frank Ehrenhart, Bad Homburg (DE); Chris I. Dalton, Bristol (GB); Michael John Wray, Bath (GB); Siani Pearson, Llanvaches (GB); Dennis Heinze, Boeblingen (DE)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 451 days.

(21) Appl. No.: 15/417,955

(22) Filed: Jan. 27, 2017

(65) Prior Publication Data
US 2018/0218148 A1    Aug. 2, 2018

(51) Int. Cl.
*G06F 21/53* (2013.01)
*G06F 16/245* (2019.01)

(52) U.S. Cl.
CPC ............ *G06F 21/53* (2013.01); *G06F 16/245* (2019.01); *G06F 2221/033* (2013.01)

(58) Field of Classification Search
None
See application file for complete search history.

(56) References Cited

U.S. PATENT DOCUMENTS

| | | | |
|---|---|---|---|
| 7,913,092 B1 | 3/2011 | Hiltunen et al. | |
| 9,055,093 B2 | 6/2015 | Borders | |
| 9,313,230 B1* | 4/2016 | Kruse | .................... H04L 63/20 |
| 2005/0257243 A1* | 11/2005 | Baker | ................ G06F 21/6218 |
| | | | 726/1 |
| 2008/0016339 A1* | 1/2008 | Shukla | .................... G06F 21/53 |
| | | | 713/164 |
| 2009/0125902 A1* | 5/2009 | Ghosh | ................ G06F 9/45533 |
| | | | 718/1 |
| 2012/0117651 A1* | 5/2012 | Edery | .................... G06F 21/51 |
| | | | 726/24 |

(Continued)

OTHER PUBLICATIONS

Holger Gantikow et al., "Providing Security in Container-Based HPC Runtime Environments," Oct. 6, 2016, pp. 685-695, Springer International Publishing AG.

(Continued)

*Primary Examiner* — Henry Tsang
(74) *Attorney, Agent, or Firm* — Hewlett Packard Enterprise Patent Department (57) ABSTRACT

Examples relate to system call policies for containers. In an example, a method includes receiving, by a container platform, a container for running an application. The container has a metadata record that specifies an application type of the application. The container platform receives a data structure that specifies a set of system call policies for a set of application types and queries the data structure to determine a policy of the set of system call policies to apply to the container based on the application type in the metadata record. A kernel implements the policy for the container to allow or deny permission for a system call by the application running in the container based on a comparison of the system call to the policy.

18 Claims, 7 Drawing Sheets

(56) References Cited

U.S. PATENT DOCUMENTS

| | | | |
|---|---|---|---|
| 2013/0055341 A1* | 2/2013 | Cooper | G06F 21/53 726/1 |
| 2013/0232540 A1* | 9/2013 | Saidi | G06F 21/6218 726/1 |
| 2014/0208386 A1* | 7/2014 | Sama | H04L 63/14 726/4 |
| 2014/0297356 A1* | 10/2014 | Jayade | G06Q 10/06316 705/7.26 |
| 2015/0040216 A1 | 2/2015 | Moore et al. | |
| 2016/0357618 A1 | 12/2016 | Degioanni et al. | |
| 2018/0060584 A1* | 3/2018 | Ahuwanya | G06F 21/566 |

OTHER PUBLICATIONS

Theo Combe et al., "To Docker or Not to Docker: A Security Perspective," IEEE Cloud Computing, Sep./Oct. 2016, pp. 54-62, IEEE.

Extended European Search Report received in EP Application No. 18151616.2, dated Jun. 8, 2018, 10 pages.

Wordpress, "Firejail Seccomp Guide," Apr. 13, 2015, 11 pages, https://13net.wordpress.com/2015/04/13/firejail-seccomp-guide/.

Wikipedia, "Protege Desktop User Documentation", available online at <https://web.archive.org/web/20161202192451/https://protegewiki.stanford.edu/wiki/Protege4UserDocs, Dec. 2, 2016, 3 pages.

Theo de Raadt, Pledge presentation at Hackfest, available online at <https://www.openbsd.org/papers/hackfest2015-pledge/>, Nov. 2015, 4 pages.

J, Frazelle, "How to use the new Docker Seccomp profiles", available online at <https://github.com/jfrazelle/blog/blob/master/content/post/how-to-use-new-docker-seccomp-profiles.md>, 2016, 4 pages.

Docker, "Seccomp security profiles for Docker", available online at <https://docs.docker.com/engine/security/seccomp/>. Mar. 5, 2016, 6 pages.

Bacis et al., "DockerPolicyModules: Mandatory Access Control for Docker Containers", IEEE Conference on Communications and Network Security (CNS), 2015, pp. 749-750.

"Classification and Grouping of Linux System Calls", available online at <http://seclab.cs.sunysb.edu/sekar/papers/syscallclassif.htm>, Aug. 18, 2016, 16 pages.

* cited by examiner

SYSTEM CALL POLICIES FOR CONTAINERS

BACKGROUND

For security and simplicity, some operating environments are configured to run applications in discrete sandboxes such as containers or virtual machines that isolate the applications from each other and from the physical hardware. The applications may interact with resources outside of the sandbox, such as the physical hardware (e.g., processors, memory, storage, I/O, etc.), via an intermediary at a lower level of the hierarchy. One example of such an intermediary is an operating system kernel. A kernel may receive instructions (i.e., system calls) from an application at an Application Programming Interface (API) of the kernel. The kernel executes the system call and returns any results to the application.

BRIEF DESCRIPTION OF THE DRAWINGS

Certain examples are described in the following detailed description with reference to the drawings, of which.

Throughout the drawings, identical reference numbers may designate similar, but not necessarily identical elements.

DETAILED DESCRIPTION OF SPECIFIC EXAMPLES

An application on a computing system may be confined to a sandbox, such as a container. The container may encapsulate application resources, libraries, other dependencies, environmental variables, and/or other resources for use by the application. The container isolates the encapsulated application to prevent interference by other applications and prevent inter-application conflicts but may restrict communications with resources outside the container by directing them through various intermediaries. For example, to access resources outside of the container, the application may make system calls to an Application Programming Interface (API) of an Operating System (OS) kernel. In one such example, an application accesses (e.g., read, write, etc.) data stored on a set of storage devices by making a system call to the kernel. Upon receiving the system call, the kernel accesses the requested data on the storage devices and returns any result therefrom to the application.

According to examples described herein, a container platform that runs and governs the container may provide the kernel with a list of allowed or prohibited system calls for each container, for security and other reasons. System calls that are associated with malicious processes or system calls that endanger system stability may be prohibited. In some examples, the container platform maintains a global list of permitted/prohibited system calls that is applied uniformly to each container and its applications.

Additionally or in the alternative, the container platform may maintain a policy data structure that defines different system call policies for different containers. In particular, the policy data structure may define a policy for a container based on the type of applications to be run within the container. In one such example, the policy data structure defines a first policy with a first set of permitted and prohibited system calls for a container that runs a webserver application and a second policy with a second set of permitted and prohibited system calls for a container that runs a database application. The container platform determines the application type and the particular policy to apply based on metadata within the container. The container platform provides this policy in the form of technical policy instructions to the kernel when the respective container is first executed.

A given policy may specify permitted and/or prohibited system calls. Furthermore, in some examples, a policy determines a number of times that a particular system call may be made by the applications within a container. For example, the system call execve( ) may be used to start a container and begin executing the applications within. However, multiple calls to execve( ) may indicate that a malicious application within the container is attempting to spawn other processes. Therefore, in some such examples, the policy specifies that the system call execve( ) may be made once by the applications within a container and that subsequent calls will be prevented. Based on this, the container and the kernel interact to deny the second and subsequent calls to execve( )

Mechanisms described herein may be useful for supporting advanced security and operation of a computing system. For instance in many examples, the policy data structure provides flexibility and security by applying independent system call policies to the containers that are tailored to each container's intended use. By defining system call policies according to application types, in some examples, the policy data structure leverages the tendency of applications of a given type to make similar use of system calls in order to manage the size and complexity of the policy data structure. This may greatly simplify policy management, while still allowing policies to be tailored to any use case. In some examples, the container platform limits the number of times that a system call can be performed. This provides an additional level of security against malicious applications.

These examples and others are described with reference to the following figures. Unless noted otherwise, the figures and their accompanying description are non-limiting, and no element is characteristic of any particular example. In that regard, features from one example may be freely incorporated into other examples without departing from the spirit and scope of the disclosure.

Figure 1:
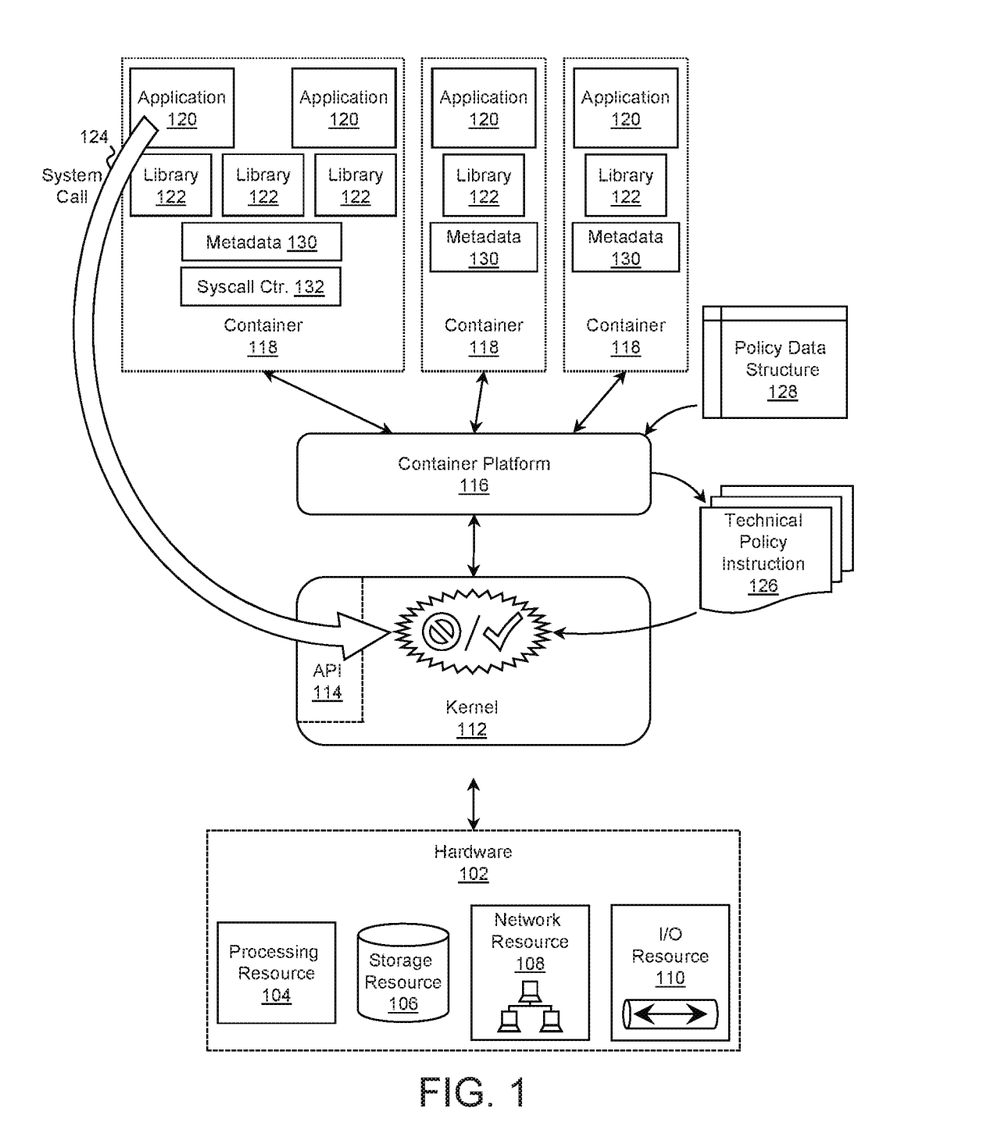
FIG. 1 is a block diagram of a computing environment according to some examples of the present disclosure.

A computing environment for practicing the technique of the present disclosure is described with reference to FIG. 1. In that regard, FIG. 1 is a block diagram of a computing environment 100 according to some examples of the present disclosure. While illustrated as a single unitary entity, the computing environment 100 may represent the processes and resources of any number of computing devices operating together in order to perform a common function. For example, the computing environment 100 may represent a single unitary computing system, a cluster of discrete computing systems, or any permutation thereof.

The computing environment 100 includes a set of physical hardware 102 that includes any number of processing resources 104 (e.g., central processing units, graphics processing units, microcontrollers, application-specific integrated circuits, programmable gate arrays, and/or other processing resources), storage resources 106 (e.g., random access memory, non-volatile memory, solid state drives, hard disk drives HDDs, optical storage devices, tape drives, and/or other suitable storage resources), network resources 108 (e.g., Ethernet, IEEE 802.11 WiFi, and/or other suitable wired or wireless network resources), I/O resources 110, and/or other suitable computing hardware.

The computing environment 100 also includes a kernel 112 (e.g., an OS kernel), a software component that governs interactions between other software components and that governs interactions with the physical hardware 102. The kernel 112 may include an API 114 to receive system calls from the other software components that request the kernel 112 to perform actions on their behalf. In some examples, these software components include a container platform 116 that runs on top of the kernel 112 and interfaces with the API 114.

A container platform 116 is a set of programs and resources that provides isolated environments, referred to as containers 118, for applications 120 running on the computing environment 100. Each container 118 may include any suitable number of applications 120 along with libraries 122, environmental settings, variables, and other dependencies that create an independent execution environment. Thus, applications 120 within the container 118 have a discrete runtime environment and operate as if they were the only applications 120 running in the computing environment 100. The containers 118 isolate the applications 120 to prevent resource conflicts, to prevent crashes from propagating between containers 118, to prevent malicious interference, and to provide other benefits. Containers also provide a convenient mechanism for distributing applications 120 as developers may distribute an application 120 and the elements used to run it by providing the container 118 as a monolithic entity.

The container platform 116 may limit containerized applications 120 to the resources of their container 118 and channel requests for outside resources through an intermediary such as the container platform 116 or the kernel 112. In an example, an application 120 running in a container 118 accesses a resource outside of the container (e.g., the hardware 102) by issuing a system call 124 to the kernel 112. The system call 124 requests that the kernel 112 perform an action on behalf of the application 120, and while accessing the hardware 102 is one example, system calls 124 may be used to request any action that is restricted to the kernel-level.

While many system calls 124 are benign, system calls may be exploited to perform tasks that an application 120 is not permitted to perform. In some examples, the application 120 may attempt a container breakout, allowing the hostile application 120 to bypass the container 118 and the container platform 116 to directly access resources that are not permitted. As an additional concern, poorly-structured system calls 124 may intentionally or inadvertently cause a kernel crash (i.e., kernel panic) that may take down the computing environment 100.

To address these issues and others, the container platform 116 may generate and provide the kernel 112 with a policy in the form of technical policy instructions 126 for each container 118 when the respective container 118 is first run. The technical policy instructions 126 specify which system calls 124 the applications 120 within the container 118 are permitted to make and/or which system calls 124 the applications 120 are prohibited from making. The kernel 112 then rejects system calls 124 that the applications 120 are not permitted to make.

In some examples, the container platform 116 determines the policy and the technical policy instructions 126 based on application type for a container 118. In more detail, because applications 120 that fulfill a particular role (e.g., web servers, data servers, databases, client applications, load balancers, text-based search engines, development environments, compilers, etc.) may have similar system call behavior, the container platform 116 maintains a policy data structure 128 that maps application types to system call policies, examples of which are described in detail below.

The application type for a container 118 may be determined based on any properties of the applications 120 within the container 118 (e.g., application role, application name, brand, version, features, build parameters, and/or other suitable properties) and is stored within a metadata record 130 of the container 118. The metadata record 130 may store the application type as a tuple or any other suitable data structure, and in an example, a metadata record 130 stores the tuple: (web server, server brand name, v2.0, 64-bit).

Because the application type determines the permissions for the container 118, in some examples, the application type is assigned by an entity other than the creator of the container 118. In some such examples, the application type is assigned by a trusted party such as an administrator or a security provider. The container platform 116 may append the metadata record 130 containing the assigned application type to the container 118 at creation, before running the container 118, or at any time therebetween.

When the container is run, the container platform 116 queries the policy data structure 128 based on the application type in the metadata record 130. From this, the container platform 116 may determine a policy from those system calls that the container's applications 120 have been approved to make and those that the container's applications 120 are not permitted to make. Based on the policy, the container platform 116 generates technical policy instructions 126 in a format suitable for use by the kernel 112.

For example, some Linux kernels 112 support the seccomp secure computing mode facility. Seccomp allows an administrator to specify permitted and/or prohibited system calls for a process such as a container 118 or an application 120 using various formats such as JavaScript Object Notation (JSON). Accordingly, in some such examples, the container platform 116 generates the technical policy instructions 126 as JSON objects, although the technical policy instructions 126 may take any other suitable format. The kernel 112 receives the technical policy instructions 126 and applies them when system calls 124 are received from an application 120 in the associated container 118.

In some examples, the container platform 116 and the kernel 112 dictate the number of times that a system call 124 may be issued by applications within a given container 118. For example, the execve( ) system call 124 may be used when a container 118 is first run, but subsequent execve( )

calls may indicate that an application 120 in the container 118 is attempting to spawn a console or otherwise escape the container 118. Accordingly, the policy data structure 128 may record that an application type is permitted to make a particular system call 124 (e.g., execve( ) clone( ) prctl( ) futex( ) etc.) or category of system calls (e.g., file-access, memory, message-queues, network-access, process, system, etc.) a given number of times and that subsequent system calls 124 are prohibited.

In some such examples, when the container platform 116 determines from the application type and the policy data structure 128 that a particularly system call 124 is permitted to be performed for a given number of times, the container platform 116 initializes a syscall counter 132 for the system call 124 or call category upon first running the container 118. In one such example, the syscall counter 132 is stored in a proc filesystem for the container 118. A proc filesystem is an example of a virtual filesystem associated with a process, such as a container 118 or an application 120, that contains runtime information rather than files per se. Each container 118 may have its own proc filesystem, and in the example, the container platform 116 initializes the syscall counter 132 by writing to a corresponding file in the proc filesystem for the container 118. In some examples, the container platform 116 initializes the syscall counter 132 to match the number of times that the corresponding system call 124 or call category is permitted to run. In some examples, the container platform 116 initializes the syscall counter to a value that signifies that the corresponding system call 124 or call category is permitted to run exactly once.

When the kernel 112 receives the respective system call 124, it reads the state of the syscall counter 132 to determine whether the system call 124 is permitted. In some examples, the syscall counter 132 in the proc filesystem is linked to a corresponding entry in a task_struct structure for the container. Similar to the proc filesystem, each process may have a corresponding task_struct memory structure that stores context data for a process for use by the kernel 112 when executing system calls on behalf of the process. In some such examples, the kernel reads the state of the syscall counter 132 via the task_struct structure to determine whether the system call 124 is permitted. If so, the kernel 112 updates the syscall counter 132 via the task_struct structure after performing the system call 124 to track the number of calls. This may include decrementing the syscall counter 132 and/or setting the counter 132 to a value indicating that the system call 124 is no longer permitted.

Figure 2:
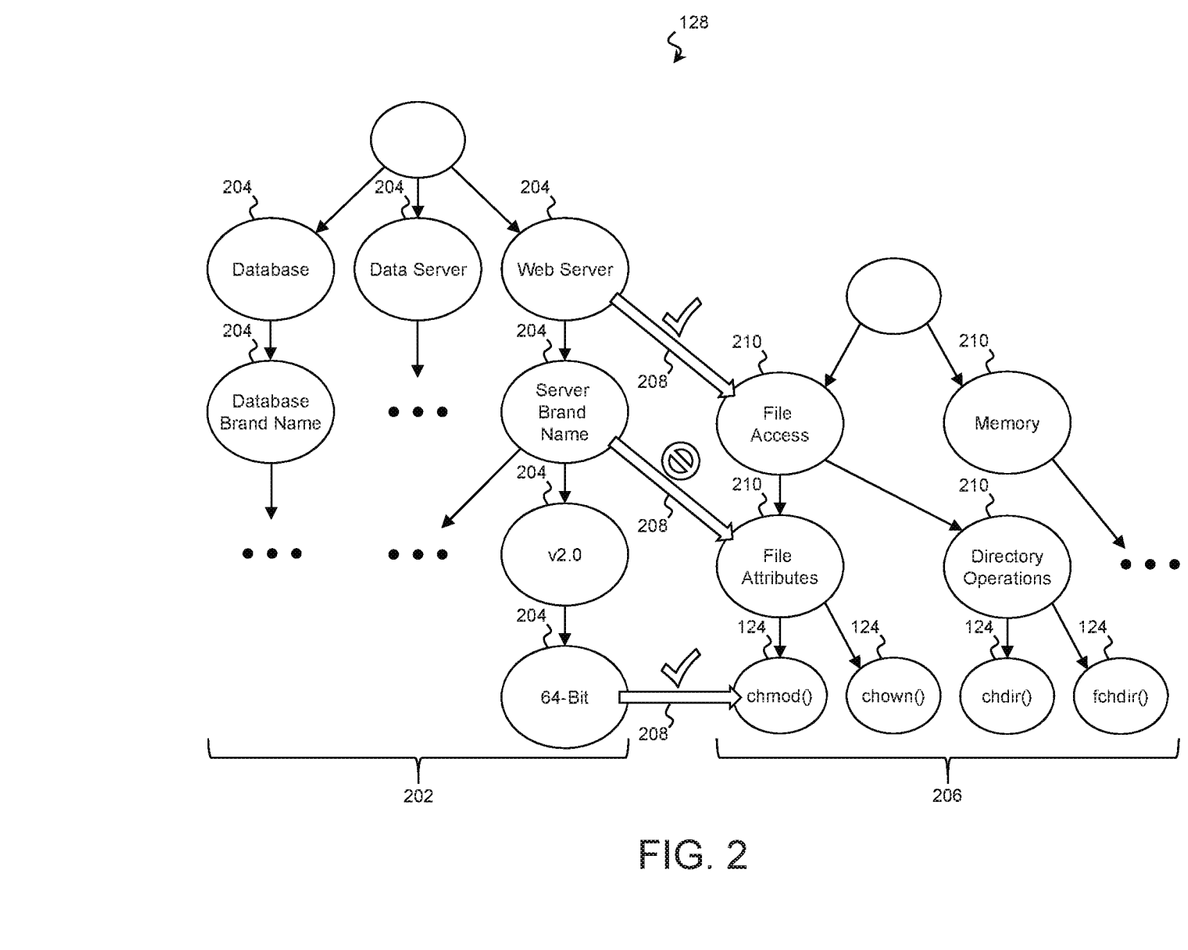
FIG. 2 is a diagram of a policy data structure according to some examples of the present disclosure.

Examples of the policy data structure 128 for use by the container platform 116 are described with reference to FIG. 2. In that regard, FIG. 2 is a diagram of a policy data structure 128 according to some examples of the present disclosure. In the examples of FIG. 2, the policy data structure 128 is structured as an ontology, although the policy data structure 128 may take any other suitable form such as an array, a hash table, a tree, a linked list, or other suitable data structure.

The policy data structure 128 records a correspondence between one or more application types and one or more system calls. Accordingly, in some examples, the policy data structure 128 includes an application type taxonomy 202 that contains various elements 204 of application types such as application roles, application names, versions, features, build parameters, and/or other suitable properties. The policy data structure 128 may also include a system call taxonomy 206 that contains system calls 124. Relationships 208 in the policy data structure 128 between the elements 204 of the application types and the system calls 124 indicate whether a system call 124 is permitted or prohibited for a given application type. In some examples, relationships 208 indicate a finite and non-zero number of times that a system call is permitted.

In some examples, the system call taxonomy 206 includes system call categories 210 (e.g., file-access, memory, message-queues, network-access, process, system, etc.) that contain the individual system calls 124. The system call categories 210 may be used to permit or prohibit the contained system calls 124 as a group, and the relationships 208 of the policy data structure 128 may link elements 204 of the application types to system call categories 210, system calls 124 themselves, and combinations thereof. For example, a first relationship 208 may specify that a type of web server is generally prohibited from performing a category 210 of system calls 124. However, a second relationship 208 may specify that a container 118 for a particular build of a web server may perform a specific system call 124 within the category 210, thereby overriding the first relationship, in part. Of course, many other types of relationships are possible and provided for.

Figure 3:
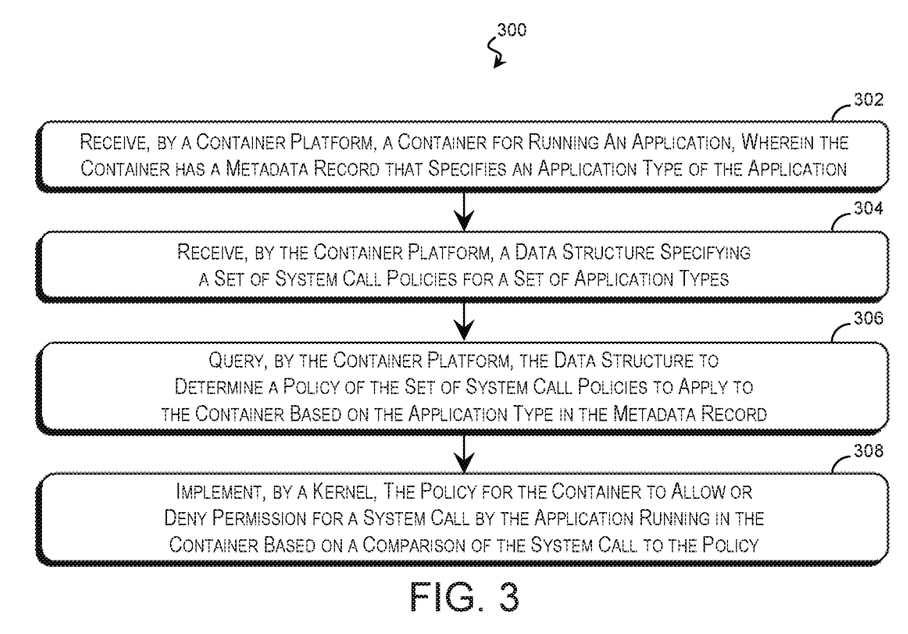
FIG. 3 is a flow diagram of a method of implementing a system call policy according to some examples of the present disclosure.
Figure 4:
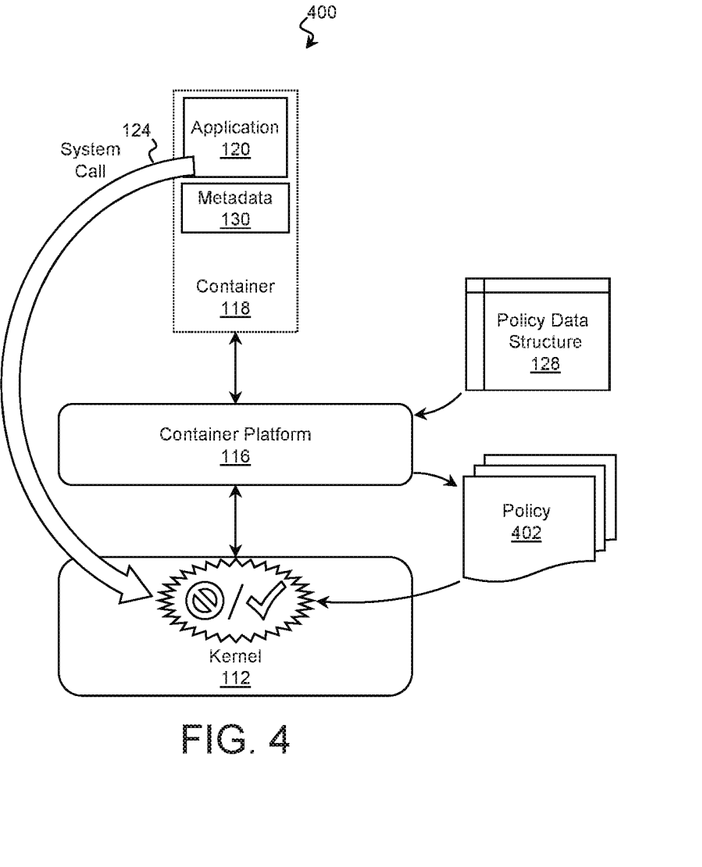
FIG. 4 is a block diagram of a computing environment performing a method of implementing a system call policy according to some examples of the present disclosure.

Examples of the technique of implementing system call policies are described with reference to FIGS. 3 and 4. FIG. 3 is a flow diagram of a method 300 of implementing a system call policy according to some examples of the present disclosure. The description of the method 300 is non-limiting, and steps may be added to and omitted from the method 300 without departing from the disclosure. Furthermore, unless noted otherwise, processes of the method 300 may be performed in any order including being performed concurrently by one or more entities. FIG. 4 is a block diagram of a computing environment 400 performing the method 300 of implementing the system call policy according to some examples of the present disclosure.

Referring to block 302 of FIG. 3 and to FIG. 4, a container platform 116 of a computing system receives a container 118 for running an application 120. The container 118 received by the container platform 116 may be substantially similar to the container 118 of FIG. 1 and may have a metadata record 130 that specifies an application type of the application 120 substantially as described above.

Referring to block 304 of FIG. 3 and to FIG. 4, the container platform 116 receives a policy data structure 128 that specifies a set of system call policies and that maps the system call policies to a set of application types. The policy data structure 128 may be substantially similar to that of FIGS. 1 and 2 and may take any suitable form such as an ontology, an array, a hash table, a tree, a linked list, or other suitable data structure.

Referring to block 306 of FIG. 3 and to FIG. 4, the container platform 116 queries the policy data structure 128 to determine a policy 402 of the set of system call policies to apply to the container 118 based on the application type in the container's metadata record 130. Referring to block 308 of FIG. 3 and to FIG. 4, a kernel 112 of the computing system 400 implements the policy 402 for the container 118. In so doing, the kernel 112 may allow or deny permission for a system call 124 by the application 120 based on a comparison of the system call to the policy 402.

Figure 5:
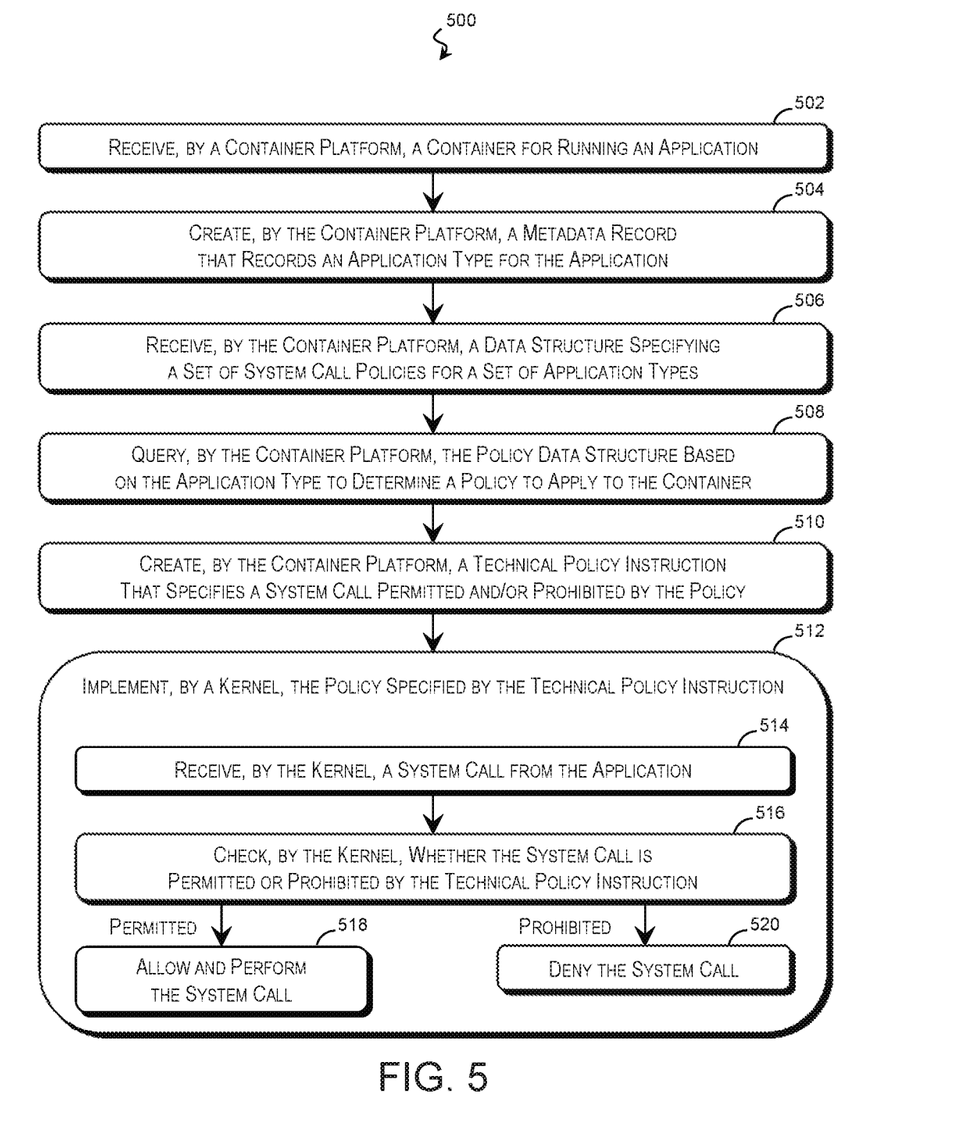
FIG. 5 is a flow diagram of a method of applying a system call policy according to some examples of the present disclosure.

Further examples are described with reference to FIG. 5. FIG. 5 is a flow diagram of a method 500 of applying a system call policy according to some examples of the present disclosure. The description of the method 500 is non-limiting, and steps may be added to and omitted from the method 500 without departing from the disclosure. Furthermore, unless noted otherwise, processes of the method 500 may be performed in any order including being performed concurrently by one or more entities.

Referring to block 502, a container platform 116 receives a container 118 for running an application 120. The container 118 may be received from a process running on the computing system such as a compiler, another computing system coupled via a network, or any other suitable source. Referring to block 504, if the container 118 does not include a metadata record 130 that records an application type of the application 120, a trusted party such as an administrator or a security provider causes the container platform 116 to create the metadata record 130. This may be performed when the container is created, when the container is received, and/or when the container is first executed.

Referring to block 506, the container platform 116 receives a policy data structure 128 that specifies a set of system call policies for a set of application types. This may be performed substantially as described in block 304 of FIG. 3, and the policy data structure 128 may be substantially similar to that of FIGS. 1-4.

Referring to block 508 of FIG. 5, the container platform 116 queries the policy data structure 128 based on the application type specified in the metadata record 130 to determine a policy of the set of system call policies to apply to the container 118 based on the application type in the metadata record 130. This may be performed substantially as described in block 306 of FIG. 3.

Referring to block 510 of FIG. 5, the container platform 116 creates a technical policy instruction 126 that specifies a system call permitted and/or prohibited by the policy determined in block 508. The technical policy instruction 126 contains a portion of the policy of block 508 and is formatted for reading by a kernel 112. The technical policy instruction 126 may take any suitable format and in some examples, is formatted as a JSON object for use with a Linux secure computing mode facility such as seccomp.

Referring to block 512, the kernel 112 implements the policy for the container 118 and the application 120 as specified by the technical policy instruction 126. This may include the kernel 112 receiving a system call 124 from the application 120 as shown in block 514. In block 516, the kernel checks the technical policy instruction 126 to determine whether the system call 124 is permitted or prohibited. Based on the results, the kernel allows and performs the system call 124 as shown in block 518 or denies the system call as shown in block 520.

Figure 6:
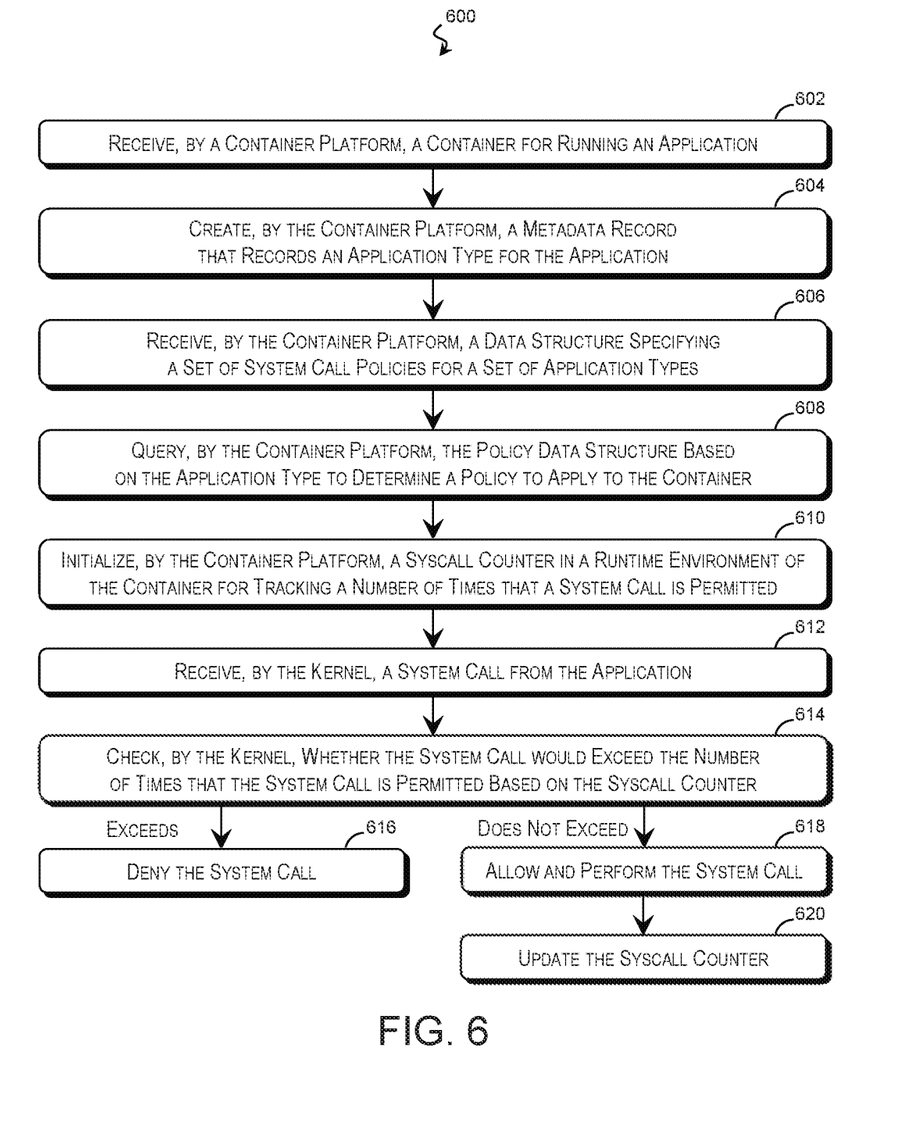
FIG. 6 is a flow diagram of a method for controlling a number of times that a system call is performed according to some examples of the present disclosure.

In some examples, it may be useful to limit the number of times that a system call is permitted as an alternative to prohibiting it outright. FIG. 6 is a flow diagram of a method 600 for controlling the number of times that a system call is performed according to some examples of the present disclosure. The description of the method 600 is non-limiting, and steps may be added to and omitted from the method 600 without departing from the disclosure. Furthermore, unless noted otherwise, processes of the method 600 may be performed in any order including being performed concurrently by one or more entities. The method 600 may be performed independently or as part of method 300 and/or method 500.

Referring to block 602 of FIG. 6, a container platform 116 receives a container 118 for running an application 120. This may be performed substantially as described in block 302 of FIG. 3 and/or block 502 of FIG. 5. Referring to block 604 of FIG. 6, if the container 118 does not include a metadata record 130 that records an application type of the application 120, a trusted party such as an administrator or a security provider causes the container platform 116 to create the metadata record 130. This may be performed substantially as described in block 504 of FIG. 5.

Referring to block 606 of FIG. 6, the container platform 116 receives a policy data structure 128 that specifies a set of system call policies for a set of application types. This may be performed substantially as described in block 304 of FIG. 3 and/or block 506 of FIG. 5.

Referring to block 608 of FIG. 6, the container platform 116 queries the policy data structure 128 based on the application type specified in the metadata record 130 to determine a policy of the set of system call policies to apply to the container 118 based on the application type in the metadata record 130. In some examples, the policy specifies that a system call 124 or a category 210 of system calls is permitted to be executed a given number of times and that subsequent attempts to make such a system call are to be denied.

Referring to block 610, the container platform 116 initializes a syscall counter 132 in a runtime environment of the container 118 for tracking the number of times that a system call is permitted. The syscall counter 132 may correspond to and track a single system call or a category of system calls. In some examples, the container platform 116 initializes the syscall counter 132 to match the given number of times that the respective system call(s) are permitted. The syscall counter 132 may take any suitable form, and in some examples, the container 118 has a proc filesystem. In some such examples, the container platform 116 initializes the syscall counter 132 by writing to a file within the proc filesystem.

Referring to block 612, a kernel 112 of the computing system receives an instance of a system call 124 tracked by the syscall counter 132 from the application 120. Referring to block 614, prior to performing the system call 124, the kernel 112 checks the syscall counter 132 to determine whether the application 120 has exceeded the given number of times that the call is permitted. In some examples, the syscall counter 132 in the proc filesystem is linked to a task_struct structure that is provided to the kernel 112. In some such examples, the kernel 112 checks the syscall counter 132 by reading the state of the counter 132 in the task_struct structure.

Referring to block 616, when the syscall counter 132 indicates that the system call is prohibited, the kernel 112 denies the system call. Conversely, when the syscall counter 132 indicates that the system call is permitted, the kernel 112 allows and performs the system call as indicated by block 618. After the system call is performed, the kernel 112 updates the syscall counter 132 as illustrated by block 620. In some examples, the kernel 112 decrements the syscall counter 132 by writing to the task_struct structure.

Figure 7:
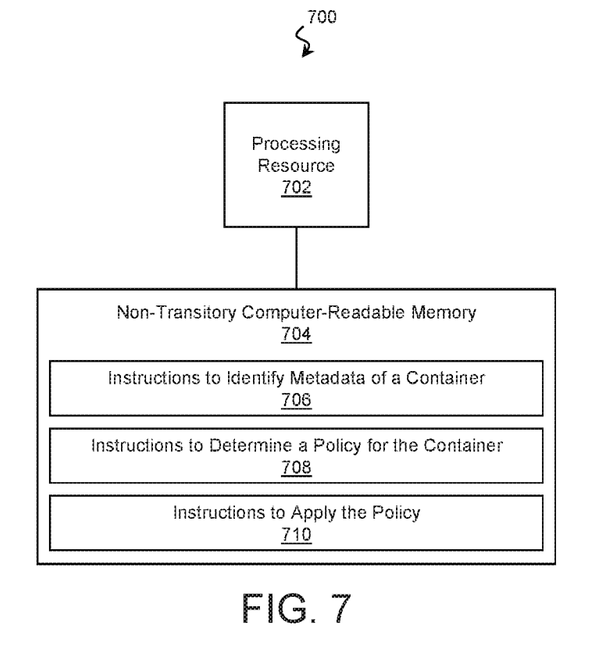
FIG. 7 is a block diagram of a computing system including a non-transitory computer-readable memory resource for implementing a system call policy according to some examples of the present disclosure.

The processes of methods 300, 500, and/or 600 may be performed by any combination of hard-coded and programmable logic. In some examples, a processing resource utilizes instructions stored on a non-transitory computer-readable memory resource to perform at least some of these processes. Accordingly, examples of the present disclosure may take the form of a non-transitory computer-readable memory resource storing instructions that perform at least part of methods 300, 500, and/or 600. FIG. 7 is a block diagram of a computing system 700 including a non-transitory computer-readable memory resource for implementing a system call policy according to some examples of the present disclosure.

The computing system 700 includes a processing resource 702 communicatively coupled to the non-transitory computer-readable memory resource 704. The processing resource 702 may include any number and combination of CPUs, GPUs, microcontrollers, ASICs, FPGAs, and/or other processing resources, and the non-transitory computer-readable memory resource 704 may include any number of non-transitory memory devices including HDDs, SSDs, other flash memory devices, optical media, battery-backed RAM, and/or other memory devices suitable for storing instructions for the processing resource 702. Accordingly, in various examples, the non-transitory computer-readable memory resource 704 stores instructions for performing processes of method 300, method 500, and/or method 600.

For example, referring to block 706, the non-transitory computer-readable memory resource 704 may store instructions that cause the processing resource 702 to identify a metadata record 130 of a container 118 for an application 120. The metadata record 130 include an application type of the application.

Referring to block 708, the non-transitory computer-readable memory resource 704 may store instructions that cause the processing resource 702 to determine a policy for the container 118 from a policy data structure 128 based on the application type in the metadata record 130 of the container 118. This may be performed substantially as described in block 306 of FIG. 3, block 508 of FIG. 5, and/or block 608 of FIG. 6. In some examples, the policy data structure 128 maps permissions for a set of system calls to a set of application types. The policy data structure 128 may classify the set of system calls into a set of system call categories 210 such that the policy specifies a permission for at least some categories 210 of the set.

Referring to block 710, the non-transitory computer-readable memory resource 704 may store instructions that cause the processing resource 702 to apply the policy by allowing or denying the application 120 permission to perform a system call 124 within a category 210 of the set of categories based on a comparison of the system call to the policy. This may be performed substantially as described in block 308 of FIG. 3, blocks 512-520 of FIG. 5, and/or blocks 612-620 of FIG. 6.

Figure 8:
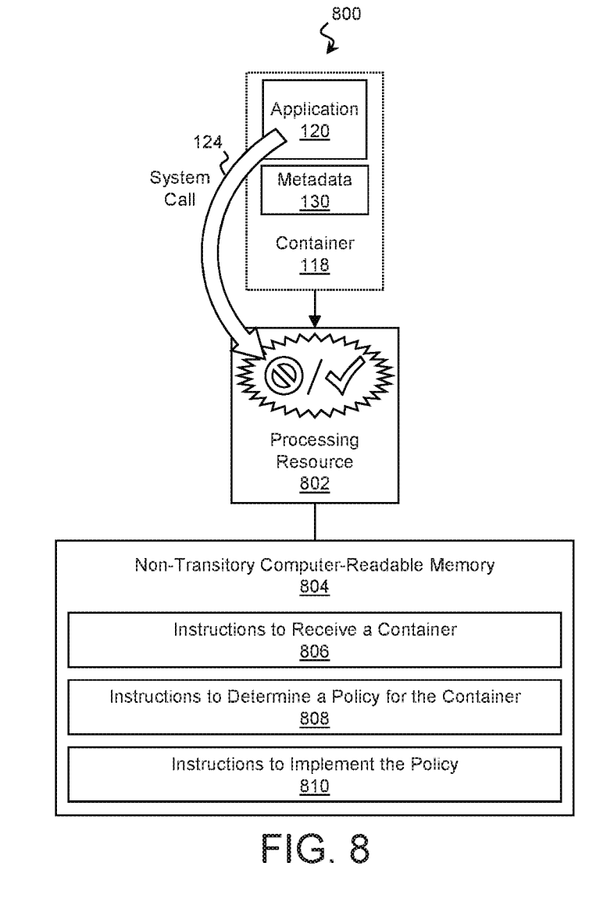
FIG. 8 is a block diagram of a computing system for controlling a number of times a system call is performed according to some examples of the present disclosure.

FIG. 8 is a block diagram of a computing system 800 for controlling the number of times a system call is performed according to some examples of the present disclosure. The computing system 800 includes a processing resource 802 coupled to a non-transitory computer-readable memory resource 804. The processing resource 802 may include any number and combination of CPUs, GPUs, microcontrollers, ASICs, FPGAs, and/or other processing resources, and the non-transitory computer-readable memory resource 804 may include any number of non-transitory memory devices including HDDs, SSDs, other flash memory devices, optical media, battery-backed RAM, and/or other memory devices suitable for storing instructions. In various examples, the non-transitory computer-readable memory resource 804 stores instructions that cause the processing resource 802 to perform the processes of method 300, method 500, and/or method 600.

Referring to block 806, the non-transitory computer-readable memory resource 804 stores instructions that cause the processing resource 802 to receive a container 118 for an application 120. This may be performed substantially as described in block 302 of FIG. 3, block 502 of FIG. 5, and/or block 602 of FIG. 6, and the container 118 may have a metadata record 130 that specifies an application type of the application 120.

Referring to block 808, the non-transitory computer-readable memory resource 804 stores instructions that cause the processing resource 802 to determine a policy to apply to the container 118 based on the application type in the metadata record 130. This may be performed substantially as described in block 608 of FIG. 6. In some examples, the policy specifies a non-zero limit on a number of times a system call 124 is permitted by the application(s) 120 of the container 118.

Referring to block 810, the non-transitory computer-readable memory resource 804 stores instructions that cause the processing resource 802 to implement the policy for the container 118 to permit the container 118 and the application 120 to perform the system call 124 up to the non-zero limit. This may be performed substantially as described in blocks 610-620 of FIG. 6.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method performed in a system comprising a hardware processor, comprising:
   providing, by a container platform, a plurality of containers for running respective types of applications, wherein each respective container of the plurality of containers has a metadata record that specifies an application type of an application that is run in the respective container;
   receiving, by the container platform, a data structure specifying system call policies for corresponding application types;
   initializing different counters associated with corresponding containers of the plurality of containers;
   in response to a system call from an application in a first container of the plurality of containers, querying, by the container platform, the data structure to determine a policy of the system call policies to apply to the first container based on a first application type in the metadata record of the first container; and
   implementing, by a kernel, the policy for the first container to allow or deny permission for the system call by the application running in the first container based on a comparison of the system call to the policy and based on a first counter associated with the first container, the first counter being part of the different counters.

2. The method of claim 1, wherein the data structure is structured as an ontology.

3. The method of claim 1, wherein the data structure classifies system calls into a set of system call categories, and wherein the policy specifies a permission for a first system call category of the set of system call categories, the first system call category comprising plural different system calls.

4. The method of claim 3, wherein the policy comprises a first relationship specifying that the first application type is prohibited from performing the first system call category of the set of system call categories, and a second relationship specifying that the first application type is permitted to perform a given system call within the first system call category, the second relationship in the policy overriding the first relationship.

5. The method of claim 1, wherein the implementing of the policy includes:

creating a technical policy instruction that includes a JavaScript Object Notation (JSON) object specifying a permission for the system call based on the policy; and applying the technical policy instruction to the first container responsive to executing the first container.

6. The method of claim 1, comprising assigning the metadata record to the respective container responsive to creating or executing the respective container.

7. The method of claim 1, wherein each respective counter of the different counters tracks a respective number of system calls made by the application running in a corresponding container of the plurality of containers.

8. The method of claim 7, wherein each respective counter of the different counters is included in the corresponding container of the plurality of containers.

9. The method of claim 7, wherein each respective counter of the different counters is included in a virtual filesystem associated with the corresponding container of the plurality of containers.

10. A non-transitory computer-readable storage medium comprising instructions that when executed cause a system to:

identify metadata of a container running an application, wherein the metadata includes an application type of the application;

determine a policy for the container from a data structure based on the application type in the metadata of the container, wherein the data structure maps permissions for system calls to application types and classifies the system calls into a set of system call categories, and wherein the policy comprises a first relationship specifying that the application type is prohibited from performing a first system call category of the set of system call categories, and a second relationship specifying that the application type is permitted to perform a given system call within the first system call category, the second relationship in the policy overriding the first relationship;

apply the policy to allow or deny the application permission to perform a system call within the first system call category based on a comparison of the system call to the policy, wherein the policy specifies that the system call is permitted to be performed a non-zero number of times, wherein the container is part of a plurality of containers running respective applications of different application types;

initialize different counters in runtime environments of corresponding containers of the plurality of containers, the different counters for tracking non-zero numbers of times that system calls are permitted to be performed by the applications of the different application types running in the corresponding containers of the plurality of containers; and responsive to the system call, check the counter in the runtime environment of the container to determine whether the system call is permitted to be performed.

11. The non-transitory computer-readable storage medium of claim 10, wherein the instructions that cause the system to apply the policy include instructions to:

create a technical policy instruction that includes a JavaScript Object Notation (JSON) object that specifies a permission for the system call based on the policy; and apply the technical policy instruction to the container responsive to executing the container.

12. The non-transitory computer-readable storage medium of claim 10, wherein the data structure is structured as an ontology.

13. The non-transitory computer-readable storage medium of claim 10, wherein the policy is implemented as a Linux secure computing mode policy.

14. A computing system comprising:

a processor; and a non-transitory computer-readable storage medium storing instructions executable on the processor to:

provide a plurality of containers for running respective types of applications, wherein each respective container of the plurality of containers has a metadata record that specifies an application type of an application that is run in the respective container;

initialize different counters associated with corresponding containers of the plurality of containers, the different counters for tracking non-zero numbers of times that system calls are permitted to be performed by the applications of the different application types running in the corresponding containers of the plurality of containers;

in response to a system call from an application in a first container of the plurality of containers, determine a policy to apply to the first container based on a first application type in the metadata record of the first container; and implement the policy for the first container and check a first counter associated with the first container, to permit the first container and the application running in the first container to perform the system call.

15. The computing system of claim 14, wherein the instructions are executable on the processor to:

receive a data structure that specifies permissions for system call policies for the different application types; and query the data structure based on the application type in the metadata record of the first container to determine the policy.

16. The computing system of claim 15, wherein the data structure is structured as an ontology.

17. The computing system of claim 15, wherein the data structure classifies system calls into a set of system call categories, and wherein the policy specifies a permission for a first system call category of the set of system call categories, the first system call category comprising plural different system calls.

18. The computing system of claim 17, wherein the policy comprises a first relationship specifying that the first application type is prohibited from performing the first system call category of the set of system call categories, and a second relationship specifying that the first application type is permitted to perform a given system call within the first system call category, the second relationship in the policy overriding the first relationship.

* * * * *